United States Patent Office 3,652,468
Patented Mar. 28, 1972

3,652,468
REINFORCED RUBBER COMPOSITIONS
Johann Schwab and Robert Grill, Vienna, Austria, assignors to Semperit Oesterreichisch-Amerikanische Gummiwerke Aktiengesellschaft, Vienna, Austria
No Drawing. Filed June 3, 1968, Ser. No. 733,796
Claims priority, application Austria, June 6, 1967, A 5,261/67
Int. Cl. C08g *41/04, 22/44*
U.S. Cl. 260—2.5                                         8 Claims

ABSTRACT OF THE DISCLOSURE

Disclosed is a process for the manufacture of vulcanized reinforced rubber compositions having superior mechanical properties and good processability. The process comprises steps of incorporating into a raw rubber composition, prior to its vulcanization, an active hydrogen containing compound which will polymerize to form a polyurethane, and then vulcanizing and polymerizing the resulting mixture to form a polyurethane lattice reinforced rubber composition.

BACKGROUND OF THE INVENTION

It has been possible to improve the mechanical properties of vulcanized rubber by:

(1) Adding reinforcing fillers such as carbon black, silica, etc.; and (2) Adding reinforcing resins such as polyurethane elastomers, butadiene resins with a high styrene content, and also adding phenolic resins generally of the type that are catalyzed by amines.

The admixture of reinforcing fillers generally causes an increase in the Defo-values and, therefore, lowers the processability of the raw composition or compound. Only limited high values may be obtained therewith. In contrast thereto, the admixture of phenolic resins are advantageous because they are introduced in liquid form and improve the processability of the raw compositions, i.e. they act as softeners for the rubber composition, until they are catalyzed by the amines. The reinforcing affects are, of course, different in different types of rubbers and in the composition of Example 1 hereinafter, i.e. an ethylene-propylene-terpolymer elastomer (52.8% ethylene, 45% propylene and 1.2% dicyclopentadiene) the reinforcing effect is essentially not noticeable.

The addition of polyurethane resin or polyurethane elastomers generally also results in a decrease in the processability of the raw composition and provides only a small reinforcing affect, especially when utilizing a linear polyurethane because of the naturally coarse distribution thereof.

SUMMARY OF THE INVENTION

The present invention provides reinforcement of vulcanized rubber compositions in which the viscosity and good processaility of the raw compound are essentially maintained. This is accomplished by adding to the raw rubber compound before vulcanization, reactants which will combine to form a polyurethane. After polymerization, the vulcanized rubber reinforced with a polyurethane lattice is considerably increased in (i) firmness, (ii) the various moduli properties, (iii) in hardness, and (iv) in notch tenacity, when compared to a similar vulcanized rubber not containing the reinforcing polyurethane lattice. Somewhat improved values are also attained in tension and wear properties.

The process of the present invention provides in the rubber, during or after its vulcanization, a close-mesh reinforcing grid or lattice,. This results from the strong interaction of the active sites of the polymerizing polyurethane, with the still active sites of the rubber; and leads to the aforementioned increase in hardness, tension strength of the material, the higher moduli, and a higher notch tenacity. In addition, other useful polyurethane properties such as resistance to oil, ozone, and weathering, are imparted to the composition. The compression-set and also the elasticity may, however, at times be slightly lowered. The effect of the aforedescribed polyurethane reinforcing lattice in the rubber lattice, is comparable to that attained by adding active reinforcing fillers, and cannot be attained by the addition of polymerized polyurethane resins to rubber.

Polyurethane resins have been softened by the addition thereto of polybutadiene and similar material, and/or their copolymers. However, no vulcanization of the rubber occured. On the other hand, it has been suggested to mix fully polymerized castor oil, or a butadiene-acrylonitrile-castor oil vulcanizate which still contained secondary OH- groups, with isocyanates, and then causing them to react.

According to the present invention, there are preferably admixed (1) di- or polyisocyanates and/or prepolymers or quasi-prepolymers containing residual NCO-groups, with (2) di- or polyols, and/or prepolymers or quasi-prepolymers containing residual hydroxyl groups, to the rubber composition before vulcanization. In place of the hydroxyl groups which contain the labile hydrogen, equivalent materials such as amines, acid amides, urea derivatives and carboxylic acids may be used. There are preferably admixed in the composition, in an amount between 3% and 20% by weight (based on the rubber) of compounds having available hydrogen, such as the polyol, amide, or carboxylic acid. It is preferred to use predominantly low molecular weight di- or polyols having primary hydroxy groups such as ethylene glycol or preferably trimethylolpropane. The catalyzation of the urethane components to form the polyurethane, must occur at the same time as the vulcanization of the rubber components of the mixture. The rubber vulcanization is commonly effected by sulfur cross-linking, or peroxide catalyzed cross-linking.

The addition of prepolymer or quasi-prepolymer components containing isocyanate groups or containing residual NCO groups, in amounts of up to 50% or even more in excess of stoichiometric, results in the formation of a polyurethane lattice having excellent reinforcing characteristics.

The use of a dicarboxylic acid as the labile hydrogen containing reactant, and a di- or polyisococyanate and/or prepolymer or quasi-prepolymer containing residual NCO groups, to form a polyamide has been described hereinbefore. When using a readily decomposable carboxylic acid as the reactant, gas is evolved resulting in the formation of a porous rubber product.

The admixture of polyurethane reactants in liquid or powder phase is very simple and easy, in contrast to other plastic materials which are tough even at high temperatures, such as the polyamides which have already been attempted as additives to rubber or reinforcing purposes.

Using the process of the present invention, the addition of the reinforcing material is adjusted to the desired characteristics of the final rubber product, without affecting the processability of the material. By selecting di- and trimerized isocyanates and also selecting compounds having a labile hydrogen with the maximum number of hydroxyl groups being on primary carbon atoms, significant effects on the final properties of the vulcanized composition are possible. The use of glycerol in place of ethylene glycol does not cause any essential improvement. This results from the fact that the glycerol has only one additional hydroxyl group, and that hydroxyl group is bonded to a secondary carbon atom. Great advantages are obtained using trimethylolpropane which has three hydroxyl groups bonded to primary carbon atoms. Hydroxyl groups in the primary carbon atoms exhibit a faster reaction rate with isocyanate.

When heating, vulcanization of the rubber components begins as a result of the heat activated action of the one or more rubber vulcanization catalysts present, usually sulfur or an organic peroxide free radical catalyst. As the heat is increased, the dimerized or trimerized isocyanate is decomposed and begins to react as aforedescribed. When there are active isocyanate moieties available for reaction earlier, they preferentially react with the vulcanization catalysts and possibly antioxidants present in the rubber composition, and would not be available for polyurethane lattice formation.

Comparison of the viscosity characteristics of the rubber compositions of the present invention, with similar rubber compositions that do not contain polyurethane components but which have been adjusted with carbon black to obtain compositions having the same hardness as compounds reinforced with the polyurethane, establish the advantages of the polyurethane reinforced composition by the lower viscosity values. This is similar to the elasticity values exhibited by the corresponding vulcanized products.

In the practice of the process of the present invention, the polyurethane lattice which provides the reinforcing effect is formed during the period of vulcanization. This lattice composed of a polyol as the hydroxyl group providing reactant, and of a polyisocyanate as the NCO group providing reactant, is formed from the respective reactant in stoichiometric proportions (urethane chains), or in excess thereof (urethane grid); by the polymerization occurring when the rubber is being vulcanized.

The following equations illustrate polymer lattice formation reactions applicable in the present process:

Equation 1

Diol+diisocyanate in stoichiometric ratio results in urethane chains

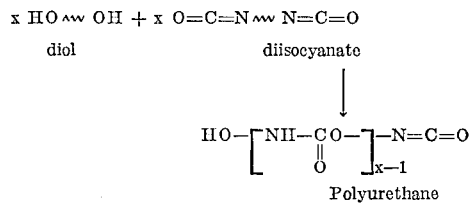

Equation 2

A polyurethane lattice results with NCO-groups in excess of the OH groups, using diisocyanates, according to the following equation:

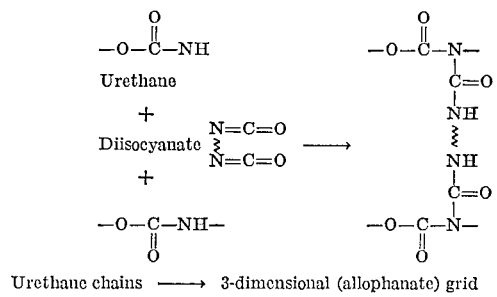

Equation 2 illustrates the aspect of the present invention whereby the reinforcing affect is increased by an increased in the available isocyanates, as a result of cross-linking. It is also possible to form a lattice when using stoichiometric proportions with an increase in difunctional reactants.

The density of the polyurethane lattice and accordingly of the reinforcing effect, is effected by the mean molecular weight of the polyurethane forming reactants, as well as the manner in which they are fashioned into the lattice.

During the vulcanization, two lattice formation processes occur:

(1) The rubber cross-linking effect with S—S bonds, C—C bonds (peroxide catalyzed cross-linking formation);

(2) Polyurethane lattice formation with urethane or allophanate linkages.

As indicated hereinbefore, isocyanate groups react with materials having active hydrogens which are present in the rubber compositions as catalysts and/or anti-oxidants. Accordingly, the vulcanization of the rubber should occur before the formation of the polyurethane lattice. This is possible when the melting or decomposition point of the isocyanate is higher than the temperature at which the rubber components are vulcanized.

The aforementioned conditions are preferably met by using a hindered or blocked polyisocyanate, e.g. a blocked isocyanate in which the NCO groups are blocked. This is illustrated by dimerized toluene-2,4-diisocyanate. (For example Desmodur TT sold by Bayer), a powder that melts at about 150° C. and decomposes at a temperature above about 160° C. The decomposition occurs by breaking the uretdion ring, freeing the NCO groups to react. The structure of this dimer follows:

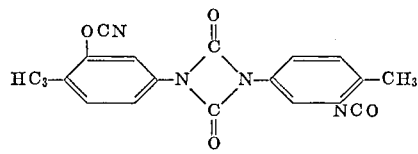

To obtain a useful rate of polyurethane lattice formation, it is necessary that the vulcanization temperature reach about 165° C. (about 6 atm.). The commonly used rubber vulcanization systems initiate cross-linking at temperatures below about 165° C.

As polyol components are suitable e.g. ethylene glycol, propylene glycol, butylene glycol, glycerol, hexane triol-1,2,6, trimethylol propane, but also prepolymers or quasi-prepolymers, in case they possess at least two free hydroxyl groups. These prepolymers are formed by conversion of a slight quantity of polyester diols (e.g. adipic acid-ethyleneglycolester, adipic acid-propylenglycol-ester, adipic acid-butyleneglycolester, sebacic acid-diolester etc.) and polyether diols with diisocyanates e.g. naphthylene-1,5-diisocyanate, diphenylmethane-4,4'-diisocyanate, toluylene-diisocyanate etc. On the other hand castor oil with its three secondary hydroxyl groups in the molecule does not have any reinforcing effects, as it only has inert secondary hydroxyl groups besides a relatively high molecular weight.

The presence of water with all of these polyols results in the formation of carbon dioxide and the formation of a porous vulcanized rubber, as follows:

Equation 3

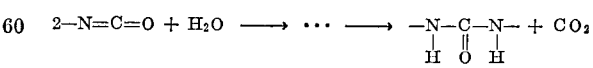

Unstable carbamide acid derivative

Except diols or polyols as active hydrogen-containing compounds also amines, particularly diamines (e.g. 1,5-naphthylene diamine, benzidine, o-tolidine, toluylene diamine, dianisidine, 3,3'-dichlorobenzidine, 4,4'-diamino-3,3'-dichlorodiphenylmethane, 4,4'-diphenylmethane, piperazine etc.), dicarboxylic and polycarboxylic acids (e.g. malonic-, succinic-, glutaric-, adipic-, suberic-, pimelic-, azelaic-, sebacic- and decanedicarboxylic acid, phthalic and citric acid etc.), acid amides (e.g. acid amides of the acids quoted above), amino alcohols (e.g. aminophenols etc.) and urea derivatives (e.g. dimethyl-, diethyl-diphenyl urea etc.) come into consideration according to this invention, as illustrated in Equations 4 and 5, which follow:

Equation 4

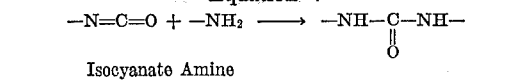

Isocyanate   Amine

When using amines, and an amount of isocyanate in excess of the stoichiometric, biuret and cross-linking occur, as follows:

Equation 5

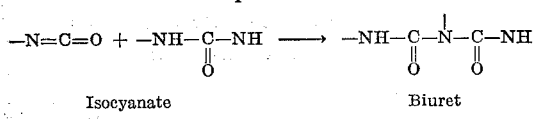

Isocyanate                        Biuret

Example 5 hereinafter illustrates the reinforcing effects when using a primary amine. Such effects are also obtained with secondary amines, as well as the corresponding multifunctional amines.

When using a carboxylic acid as the hydrogen providing polyurethane reactant, an acid amide is formed in addition to the carbon dioxide which remains free in the vulcanized rubber product if heating is carried out under pressure. This chain or lattice, obtained when using an excess of isocyanate, has a reinforcing affect. This is illustrated in Equation 6.

Equation 6

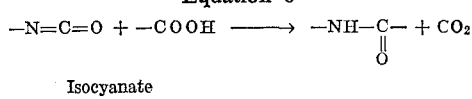

Isocyanate

If the polyurethane formation occurs without the application of pressure, i.e. not above atmospheric pressure, a porous rubber with a uniform porosity ensues.

Example 6 hereinafter illustrates the reinforcing effect obtained when forming a polyurethane using a dicarboxylic acid reactant and a diisocyanate reactant, and vulcanizing under pressure. It is to be understood that various polyfunctional reactants and combinations may be used in place of those illustrated.

The invention is further illustrated in the examples.

EXAMPLE 1

The effect of polyurethane reinforcement in ethylene-propylene-polymer referred to herein as EP-T rubber, compared with a (i) somewhat similar amount of a phenol resin- hexamethylenetetramine reinforcement and a (ii) high styrene-butadiene resin, follow:

|  | G 280 | G 282 | G 284 | G 289 |
|---|---|---|---|---|
| EP-T rubber (APUK BP 1765, denoting an unsaturated ethylene propylene rubber having the following characteristics): Propylene percentage, 40% per weight; Unsaturation, 2.2 mol percent; specific weight, 0.87; Ashes, maximum 0.5%; Volatile components, maximum 0.5%; Mooney plasticity, 45 ML4, 100%) | 100. | 100. | 100. | 100. |
| HAF-Russ designating a carbon black with a high abrasion resistance | 50. | 50. | 50. | 50. |
| In active carbon black | 40. | 40. | 40. | 40. |
| Ethyleneglycol |  | 5. |  |  |
| Thermosetting phenolic resin (Cellobond H 831, having the following physical and chemical properties): Type, reinforcing resin; Nature, modified phenolic; Form, powder with 8% hexamine, Softening point, 85-95° C., Specific gravity at 25° C., 1,18; Particle size: on 36 mesh, 0%; on 60 mesh maximum, 0-15%; on 150 mesh maximum, 10%; hardening time at—130° C., 110-140 second |  |  | 20 |  |
| High styrene butadiene resin (Duranit 15, denoting an interpolymer of styrene and 15% butadiene having the following characteristics): Specific weight, 1.0; Softening point on B.S. No. 1493/-9148, 58-60° C.; Vibrating volume, 4.0-4.5 l./kg.; Solubility, swelling in aromatics and chlorine hydrocarbons; minute swelling in aliphatics |  |  |  | 20. |
| Stearic acid | 1. | 1. | 1. | 1. |
| Tetramethylthiuram disulfide (Vulkacit Thiuram) | 2. | 2. | 2. | 2. |
| 2-merkaptobenzothiazole (Vulkacit Merkapto) | 1. | 1. | 1. | 1. |
| Sulfur | 5. | 5. | 5. | 5. |
| Dimerized toluene-2,4-diisocyanate (Desmodur TT) |  | 15.5 |  |  |
| Total | 199. | 219.5 | 219. | 219. |
| Heating conditions 40'/6 atm., specific weight | 1.15 | 1.16 | 1.14 | 1.14 |
| Composition characteristics: |  |  |  |  |
| Defo 50 | 5,550/16 | 8,050/15 | 3,800/18 | 6,550/12 |
| Strength, kp./cm.² | 73 | 95 | 23 | 64 |
| Stretch, percent | 303 | 300 | 383 | 200 |
| Modulus 100, kp./cm.² | 38 | 49 | 18 | 53 |
| Modulus 300, kp./cm.² | 73 | 95 | 23 |  |
| Hardness, °Sh | 75 | 89 | 74 | 86 |
| Elasticity, percent | 39 | 34 | 28 | 35 |
| Notch tenacity. kp./cm. | 29 | 30 | 24 | 26 |
| Compression Set B, percent | 73.2 | 48.1 | 94.7 | 66.2 |
| Abrasion (DVM), mm.³ | 250 | 325 | 467 | 312 |

EXAMPLE 2

Reinforcing effect with natural rubber:

|  | G 254 | G 255 |
|---|---|---|
| Smoked Sheets II, a crude rubber type description applied to a coagulum which is sheeted by passing through even spaced rolls, soaked to remove water and soluble matter, hung for dripping and smoked by hanging in the presence of heat and smoke from smoldering wood fired until the moisture content has been reduced to 0.75% | 100. | 100. |
| Highly active silica (Aerosil 2491/380 designating a highly dispersed silicic acid having the following characteristics): SiO2, >99.8%; Adherent moisture, <1.5%; loss on ingnition; pH (4% water solution), 3.6-4.3; BET-upper surface, 380 m.²/g. Size of particles: Primary, 8 mµ, secondary, µ; Refractive index, 1.45; Bulk density, 40-60 g./l.; Specific weight, 2.20 g./cm.³; Oil demand, 350% | 20. | 20. |
| Chalk (Chalk Supra) | 20. | 20. |
| Spindle oil | 10. | 10. |
| Glycerine |  | 5. |
| Stearic acid | 1.5 | 1.5 |
| Zinc oxide (RS) | 6. | 6. |
| Benzothiazyl-2-sulfenmorpholide (Vulkacit MOZ) | 1.2 | 1.2 |
| Sulphur | 2.5 | 2.5 |
| Dimerized toluene-2,4-diisocyanate (Desmodur TT) |  | 15.5 |
| Total | 161.2 | 181.7 |
| Heating conditioning 30 minutes/6 atm.; specific weight | 1.14 | 1.15 |
| Composition characteristics: |  |  |
| Defo 50 | 3,900/29 | 3,900/28 |
| Mooney Plast. 100° C | 94 | 116 |
| Strength, kp./cm.² | 61 | 116 |
| Stretch, percent | 577 | 530 |
| Modulus 100, kp./cm.² | 6 | 14 |
| Modulus 300, kp./cm.² | 18 | 48 |
| Hardness, °Sh | 41 | 56 |
| Elasticity, percent | 58 | 51 |
| Notch tenacity, kp./cm | 6 | 13 |
| Compression set B, percent | 30.9 | 28.0 |

EXAMPLE 3

In a butadiene-acrylonitrile (NBR) rubber composition, the influence of the dosage of the polyurethane basic components, and also that the polyol components, is illustrated, as follows:

|  | G 229 | G 245 | G 262 | G 263 | G 246 | G 244 |
|---|---|---|---|---|---|---|
| NBR-rubber (Perbunan N 2807 designating a butadiene interpolymer containing 28% acrylonitril having the following properties: Chemical composition, cca 28% acrylnitrile, cca 72% butadiene, Appearance, light brown; Plasticity, Mooney (ML4'): 45±5; Density, cca 0,98 g,/cm,$^3$; Solubility, masticated Perbunan N 2807 has a very good solubility in conventional solutions for nitril rubber such as for example aromatic and chlorine hydrocarbons as well as ketons; Colorization, colorizes slightly at illumination | 100.0 | 100.0 | 100.0 | 100.0 | 100.0 | 100.0 |
| Methylene-bis-thioglycol dibutylcarboxylic acid ester (Plastikator 88) | 5. | 5. | 5. | 5. | 5. | 5. |
| Paraffin | 1. | 1. | 1. | 1. | 1. | 1. |
| Glycerine | | | 5. | | 7.5 | 10. |
| Ethyleneglycol | | | | 5. | | |
| Hexan triol-1,2,6 | | | | 5. | | |
| TiO$_2$ | 5. | 5. | 5. | | 5. | 5. |
| Red oxide | 3. | 3. | 3. | 3. | 3. | 3. |
| (RS) Zinc oxide | 5. | 5. | 5. | 5. | 5. | 5. |
| Benzothiazyl-2-sulfenmorpholide (Vulkazit MOZ) | 1.2 | 1.2 | 1.2 | 1.2 | 1.2 | 1.2 |
| Sulphur | 10. | 10. | 10. | 10. | 10. | 10. |
| Dimerized toluene-2,4-diisocyanate (Desmodur TT) | | 15.5 | 15.5 | 10.8 | 23.3 | 31. |
| Total | 130.2 | 150.7 | 150.7 | 146. | 161. | 171.2 |
| Heating conditions 40 minutes/6 atm,. specific weight | 1.14 | 1.14 | 1.14 | 1.14 | 1.16 | 1.17 |
| Composition characteristics: | | | | | | |
| Defo 50 | 1,000/26 | 1,350/30 | 1,450/29 | 1,600/30 | 1,275/29 | 1,450/26 |
| Mooney plasticity, 100° C | 34.6 | 60.1 | 54.8 | 48.2 | 55.7 | 39.3 |
| Strength | 36 | 75 | 79 | 71 | 82 | 96 |
| Tensile strength | 143 | 140 | 143 | 153 | 140 | 97 |
| Modulus 100 | 24 | 43 | 57 | 40 | 57 | |
| Hardness according to Shore | 62 | 72 | 79 | 69 | 80 | 85 |
| Notch tenacity | 7 | 9 | 11 | 8 | 9 | 14 |
| Specific resist current flow (×10$^{-12}$) | 0.5 | 4.3 | 2.0 | 1.5 | 4.6 | 4.3 |
| Compression Set B | 33.4 | 24.2 | 39.4 | 31.8 | 30.1 | 51.8 |
| Abrasion | 188 | 130 | 133 | 125 | 129 | 140 |
| Elasticity | 7 | 20 | 20 | 18 | 20 | 23 |

EXAMPLE 4

Polyurethane reinforcement in ethylene-propylene-copolymer (peroxide catalyzed rubber). Comparison is made of the characteristics of the product with a similar composition that does not contain polyurethane, adjusted to the same hardness.

|  | G 250 | G 251 | G 253 |
|---|---|---|---|
| EP-Copolymer-rubber (Dutral N designating an unsaturated ethylene propylene rubber having the following characteristics): Density, 0.87 g./cm.$^3$; Propylene percentage, 45–50% mol; Mooney viscosity, 30–40 ML (1+4) 100° C.; Ashes, <1%; Crystallinity (measured by X-rays): Antioxygenes, cca. 0.2%; Odors, odorless; Color, light grey | 100. | 100. | 100. |
| On carbon based active carbon black | 50. | 50. | 50. |
| Soft | 20. | 20. | 20. |
| Spindle oil | 10. | 10. | 10. |
| Glycerol | | 5. | |
| Zinc oxide | 5. | 5. | 5. |
| Organic Diperoxide catalyst (Peroximon F 40 designating an organic diperoxide having the following composition characteristics: 40% alpha, alpha prime bis-ter-butyl peroxide of m-p di-isopropyl benzene and 60% inert inorganic carrier (calcium carbonate) | 7.5 | 7.5 | 7.5 |
| Sulphur | 0.35 | 0.35 | 0.35 |
| Dimerized toluene-2,4-diisocyanate (Desmodur TT) | | | 15.5 |
| Total | 192.85 | 213.35 | 232.85 |
| Heating conditions 30 minutes/6 atm.; specific weight | 1.08 | 1.11 | 1.16 |
| Composition characteristics: | | | |
| Defo 50 | 1,750/8 | 1,850/8 | 3,250/7 |
| Mooney plast, 100° C | 49.3 | 66.4 | 92.0 |
| Strength | 50 | 54 | 83 |
| Tensile strength | 393 | 380 | 257 |
| Modulus 100 | 19 | 32 | 48 |
| Hardness | 59 | 80 | 77 |
| Elasticity | 47 | 38 | 36 |
| Notch tenacity | 10 | 18 | 15 |
| Specific current-flow resistance | 1.7·10$^8$ | >3.10$^{13}$ | 4.6.10$^2$ |
| Compression set B | 12.0 | 20.6 | 10.3 |
| DVM abrasion | 372 | 441 | 336 |

EXAMPLE 5

Polyurethane reinforcement of butadiene-acrylonitrile rubber (NBR), adding a diamine to the composition.

|  | G 304 | G 305 |
|---|---|---|
| NBR-rubber (Perbunan 2807) | 100. | 100. |
| Methylene-bis-thioglycol-dibutyl carboxlic acid ester (Plastikator 88 designating a composition of methylene-bis-thioglycollic acid, di-butyl ester) | 5. | 5. |
| Paraffin | 1. | 1. |
| p-Phenylendiamine | | 5. |
| TiO$_2$ | 5. | 5. |
| Red oxide | 3. | 3.2 |
| Benzothiazyl-2-sulfenmorpholide (Vulkacit MOZ) | 1.2 | 1.2 |
| Sulfur | 10. | 10. |
| Dimerized toluene-2,4-diisocyanate (Desmodur TT) | | 8.9 |
| Zinc oxide (RS) | 5. | 5. |
| Total | 130.2 | 144.1 |
| Heating conditions 40 minutes/6 atm., Specific weight | 1.14 | 1.15 |
| Composition characteristics: | | |
| Defo 50 | 1,000/26 | 1,300/22 |
| Mooney plast., 100° C | 34.6 | 45.0 |
| Strength | 36 | 68 |
| Tensile strength | 143 | 133 |
| Modulus 100 | 24 | 53 |
| Hardness | 62 | 75 |
| Elasticity | 7 | 6 |
| Notch tenacity | 7 | 10 |
| Compression set B | 33.4 | 41.3 |
| DVM abrasion | 188 | 205 |

EXAMPLE 6

Polyurethane reinforcement in an ethylene-propylene (EP) copolymer elastomer using dicarboxylic acid and diisocyanate as the polyurethane forming reactants. When heated, a porous rubber product is produced.

|  | G 301 | G 306 |
|---|---|---|
| EP-copolymer rubber (Dutral N) | 100. | 100. |
| Spindle oil | 15. | 15. |
| SPF-Russ | 21. | 21. |
| Adipic acid | | 7. |
| Zinc oxide (RS) | 5. | 5. |
| Organic diperoxide catalyst (Peroximon F 40) | 7.5 | 7.5 |
| Sulfur | 0.35 | 0.35 |
| Dimerized toluene-2,4-diisocyanate (Desmodur TT) | | 9.16 |
| Total | 148.85 | 165.01 |
| Heating conditions 40 minutes/6 atm.; specific weight | 0.99 | 1.02 |
| Composition characteristics: | | |
| Defo 50 | 900/10 | 1,025/12 |
| Mooney plast., 100° C | 33.0 | 36.1 |
| Strength | 58 | 79 |
| Tensile strength | 420 | 523 |
| Modulus 100 | 11 | 15 |
| Modulus 300 | 35 | 39 |
| Hardness | 49 | 62 |
| Elasticity | 50 | 41 |
| Notch tenacity | 10 | 14 |
| Specific current-flow resistance | 1.10⁶ | >3.10¹³ |
| Compression set B | 12.6 | 33.3 |
| DVM abrasion | 93 | 179 |

Having thus described the invention, what we claim as new and desire to be secured by Letters Patent, is as follows:

What is claimed is:

1. A process for the manufacture of a vulcanized reinforced rubber composition comprising the steps of:
   (a) admixing (i) a raw rubber composition which has not been vulcanized, (ii) from 3 to 20 parts by weight per 100 parts by weight of raw rubber of an active hydrogen containing compound selected from the group consisting of polylols having 2 to 3 hydroxyl groups and 2 to 6 carbon atoms, phenylenediamine, and adipic acid, and (iii) a molar excess based on available —NCO groups of the dimerized diisocyanate having the formula:

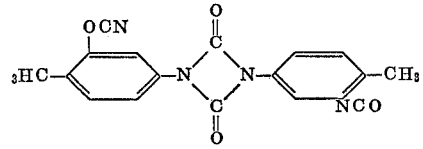

(b) vucanizing the mixture (a) in the presence of sulphur or a peroxide catalyst at a temperature of at least 165° C.

2. The process of claim 1 wherein said hydrogen providing reactant is p-phenylenediamine.

3. The process of claim 1 wherein said hydrogen providing reactant is adipic acid.

4. The process of claim 1 wherein the vulcanization is carried out utilizing a carboxylic acid reactant at a pressure up to one atmosphere, resulting in the formation of a porous reinforced vulcanized rubber product.

5. The process of claim 1 wherein the NCO containing polyurethane reactant has its melting or decomposition point above the temperature at which the vulcanized rubber lattice is formed.

6. The process of claim 1 wherein said hydroxyl providing reactants are selected from the group consisting of ethylene glycol, propylene glycol, glycerol, and hexanetriol-1,2,6 and trimethylolpropane.

7. The process of claim 1, wherein said dimerized diisocyanate is dimerized 2,4-toluene diisocyanate.

8. The process of claim 7, wherein said active hydrogen containing compound is selected from the group consisting of ethylene glycol and trimethylolpropane.

References Cited

UNITED STATES PATENTS

| 2,356,005 | 8/1944 | Roquemore | 117—75 |
| 2,609,349 | 9/1952 | Cass | 260—23 |
| 2,642,403 | 6/1953 | Simon et al. | 260—2.5 |
| 2,690,780 | 10/1954 | Cousins | 152—349 |
| 3,429,948 | 2/1969 | Massoubre | 260—859 |
| 3,524,834 | 8/1970 | Allport | 260—859 |

FOREIGN PATENTS

| 149,056 | 6/1949 | Australia. |
| 1,118,447 | 11/1961 | Germany. |
| 947,584 | 1/1964 | Great Britain. |
| 893,273 | 4/1962 | Great Britain. |

OTHER REFERENCES

Kunstoff Handbuch, Band VIII, Polyurethane; Vieweg und Höchten; Carl Hanser Verlag, München 1966; pages 17, and 257–261.

DONALD E. CZAJA, Primary Examiner

C. W. IVY, Assistant Examiner

U.S. Cl. X.R.

260—3, 857 L, 859, 77.5 CR